US010891689B2

(12) United States Patent
Pinski et al.

(10) Patent No.: US 10,891,689 B2
(45) Date of Patent: Jan. 12, 2021

(54) CONSENT MANAGEMENT SERVICE SYSTEM

(71) Applicant: Hitachi, Ltd., Tokyo (JP)

(72) Inventors: David Pinski, San Mateo, CA (US); Aritoki Takada, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 655 days.

(21) Appl. No.: 15/706,591

(22) Filed: Sep. 15, 2017

(65) Prior Publication Data

US 2019/0087892 A1    Mar. 21, 2019

(51) Int. Cl.
| | |
|---|---|
| *G06Q 40/00* | (2012.01) |
| *G06Q 40/02* | (2012.01) |
| *G06F 21/62* | (2013.01) |
| *H04L 9/06* | (2006.01) |
| *G06Q 20/10* | (2012.01) |
| *H04L 9/32* | (2006.01) |

(52) U.S. Cl.
CPC ......... *G06Q 40/02* (2013.01); *G06F 21/6245* (2013.01); *G06Q 20/108* (2013.01); *H04L 9/0637* (2013.01); *H04L 9/3239* (2013.01); *H04L 2209/38* (2013.01); *H04L 2209/56* (2013.01)

(58) Field of Classification Search
USPC ...... 705/35, 37, 39, 40, 26, 65, 50; 709/217, 709/226, 245, 203; 715/719; 707/689, 707/688; 726/5, 28; 713/176
See application file for complete search history.

(56) References Cited

U.S. PATENT DOCUMENTS

| | | | |
|---|---|---|---|
| 9,935,961 B2* | 4/2018 | Castinado | H04L 63/102 |
| 10,026,118 B2* | 7/2018 | Castinado | H04L 9/3239 |
| 10,097,356 B2* | 10/2018 | Zinder | G06F 21/6254 |
| 10,212,145 B2* | 2/2019 | Chavez | H04L 63/123 |
| 10,282,558 B2* | 5/2019 | Chan | G06F 21/602 |
| 10,346,406 B2* | 7/2019 | Booz | H04W 12/10 |
| 10,454,683 B2* | 10/2019 | Weimer | H04L 9/3239 |
| 10,505,741 B1* | 12/2019 | Conley | H04L 9/083 |
| 10,637,665 B1* | 4/2020 | Sundaresan | G06F 21/32 |
| 10,824,983 B1* | 11/2020 | Stuart | G06Q 20/405 |
| 2007/0088957 A1* | 4/2007 | Carson | G11B 20/00086 713/176 |
| 2013/0263283 A1 | 10/2013 | Peterson et al. | |

(Continued)

OTHER PUBLICATIONS

A flexible payment scheme and its role-based access control; IEEE Transactions on Knowledge and Data Engineering (vol. 17, Issue: 3, pp. 425-436); Hua Wang, Jinli Cao, Yanchun Zhang; Mar. 1, 2005.. (Year: 2005).*

(Continued)

*Primary Examiner* — Tien C Nguyen
(74) *Attorney, Agent, or Firm* — Procopio, Cory, Hargreaves & Savitch LLP

(57) ABSTRACT

Example implementations described herein are directed to a consent management service system, which involves a system to record consent between a bank and its consumers and to share them to a third party audit servicer. The system ensures that the consent records are disclosed to individuals or organizations that are eligible to access the record without modification, and helps them detect and prevent malicious attempts by banker or consumer.

18 Claims, 21 Drawing Sheets

(56) References Cited

U.S. PATENT DOCUMENTS

2016/0098723 A1\* 4/2016 Feeney ............... G06Q 20/065
 705/75
2016/0283941 A1\* 9/2016 Andrade .............. H04L 9/3247
2017/0132630 A1\* 5/2017 Castinado ............ G06Q 20/382
2019/0272392 A1\* 9/2019 Falah .................... G06Q 10/10

OTHER PUBLICATIONS

Network security risks in online banking; Proceedings. 2005 International Conference on Wireless Communications, Networking and Mobile Computing, 2005, (vol. 2, pp. 1229-1234); Nie Jin, Ma Fei-Cheng; Jan. 1, 2005.. (Year: 2005).\*

\* cited by examiner

First Name  John

Last Name  Doe

Birthday  01/01/1990

Photo - ID    select   upload

Account Type  ○ Checking
              ● Saving

Select Plan   ○ Plan A
              ● Plan B

☐ I hereby agree to Terms and Conditions submit

FIG. 2

| CONSUMER'S PERSONAL INFORMATION 320 | |
|---|---|
| First Name | John |
| Last Name | Doe |
| Birthday | 01/01/1990 |
| Address 1 | 9999 Somewhere St. |
| Address 2 | Apt 99 |
| City | Somecity |
| State | Somestate |
| Zip | 99999 |
| Country | USA |
| Phone No. | +1-999-999-9999 |
| Email | someone@example.com |
| SSN | 999-999-9999 |

| AGREEMENT INFORMATION | |
|---|---|
| Type | Opening Account |
| Document URI | http://somebank.example.com/agreement/somefinancialservice/1.10 |
| Document version | 1.10 |
| Document hash value | 5BF799ADE1C3A67B |
| Effective Date | 7/1/2017 |
| End Date | 6/30/2018 |
| Account Type | Saving |
| Selected Plan | B |
| Optional Plan X | Accepted |
| Insurance Coverage | $250,000 |

FIG. 6

| Date | Counterparty | Subject |
|---|---|---|
| 4/1/2017 | Piggy Bank | Opening Account |
| ... | ... | ... |

The agreement is made as of 4/1/2017 by and between Piggy Bank and John Doe.

1. Term
...

Attached Evidences
Photo-ID

FIG. 13

To: Routing No. 012345678
Account No. 6819550217

Amount $1000
Date 05/01/2017 submit

FIG. 16

| AGREEMENT INFORMATION | |
|---|---|
| Type | Money Transfer |
| From: Routing No. | 012345678 |
| From: Account No. | 8003158188 |
| To: Routing No. | 012345678 |
| To: Account No. | 6819550217 |
| Date | 05/01/2017 |
| Amount | 1,000 USD |

CONSENT MANAGEMENT SERVICE SYSTEM

BACKGROUND

Field

The present disclosure is directed to an account management system, and more specifically, to systems and methods for managing consent records for accounts.

Related Art

In related art implementations, there can be many communications between a financial institution and its customer (individual or business). Some of the communications are agreements to conduct activities, such as opening an account, a money deposit, a money transfer order, and so on. In such cases, there is "consent" between the institution and the consumer. Typically each consent record is for providing a specific service from the institution to the consumer.

In related art implementations, such records were stored in paper-form, ledgers or bank passbooks. As banks have adopted digital systems, consent records have been stored as database records in related art implementations. As these records are stored in normalized databases, the actual record can be scattered across multiple systems and database tables. Banks build and maintain the systems to store and retrieve these records. In such related art implementations, an outside system or auditor can retrieve or reconstruct a consent record without using the bank's system. Such implementations differ from the older paper system which is understandable to anyone with banking knowledge, or even a consumer.

In the event there is a dispute with between a bank and the customer, the bank uniquely holds the system of record, and the customer is dependent on the bank to produce an accurate record. Records stored digitally in databases are subject to potential alteration by anyone with access to these systems. This includes bankers, system administrators or potentially hackers. Additionally, it is possible for a bank to alter or update their systems in a way that reconstructs consent records inaccurately. Thus, the customer or any other individuals or organizations related to the consent may want to keep the consent record alternation-free and accessible from them.

In an example related art implementation, U.S. patent application Ser. No. 2013/0263283 discloses a technique for electric signature service, which stores, manages and discloses documents with electric signatures which are typically records of consents. Those consent records can be evidence of the consents and each consent record can be compared with the service provided to the consumer to see the consent was executed correctly or not.

However, the electric signature service and the document itself may not ensure the actual business process is executed as described as the document. In other words, there are some risks that remain. For example, there might be a difference between the business process and the description in a record for the business process, there might be a business process without any evidence of consent, or there might be evidence of consent without any business process related to the consent. Such conflicts can be found and examined by comparing the consent record and the business process and/or the service provided, but such implementations are difficult as it requires a person who has a will to examine the consistency of the records and has access to both the consent record and evidence of the business process and/or the service provided.

There have been recorded incidents where banks have improperly created of altered consent records. These cases are difficult to identify and prove because they control the system of record. In some cases the altered records are only identified because bank employees came forward to disclose the violation of records policies.

SUMMARY

Aspects of the present disclosure include a method for maintaining bank account verification through an external system coupled to a bank system via a network, the method including a) for a generation at the bank account, generating a blockchain between the external system and the bank system associated with consumer consent information utilized for generating the bank account; b) associating the blockchain of the generation of the bank account at the bank system and the external system; c) opening the bank account at the bank system; and d) providing verification to a consumer through the external system.

Aspects of the present disclosure further include a non-transitory computer readable medium, storing instructions for maintaining bank account verification through an external system coupled to a bank system via a network, the instructions involving a) for a generation at the bank account, generating a blockchain between the external system and the bank system associated with consumer consent information utilized for generating the bank account; b) associating the blockchain of the generation of the bank account at the bank system and the external system; c) opening the bank account at the bank system; and d) providing verification to a consumer through the external system.

Aspects of the present disclosure can further include a system for maintaining bank account verification, which can involve an external system coupled to a bank system via a network, the external system including a processor, configured to, a) for a generation at the bank account, generate a blockchain between the external system and the bank system associated with consumer consent information utilized for generating the bank account; b) associate the blockchain of the generation of the bank account at the bank system and the external system; c) open the bank account at the bank system; and d) provide verification to a consumer through the external system.

BRIEF DESCRIPTION OF DRAWINGS

FIG. 2 illustrates an example of a consumer banking user interface, in accordance with an example implementation.

FIG. 4 illustrates an example of consumer personal information, in accordance with an example implementation.

FIG. 6 illustrates agreement information, in accordance with an example implementation.

FIG. 9(*b*) illustrates an example of recording a transaction in a blockchain, in accordance with an example implementation.

FIG. 9(*c*) illustrates an example of an audit, in accordance with an example implementation.

FIG. 13 illustrates a matching consent record, in accordance with an example implementation.

FIG. 16 illustrates an example of consumer banking U/I as a webpage, in accordance with an example implementation.

FIG. 17 illustrates example of agreement information for a money transfer, in accordance with an example implementation.

DETAILED DESCRIPTION

Figure 1:
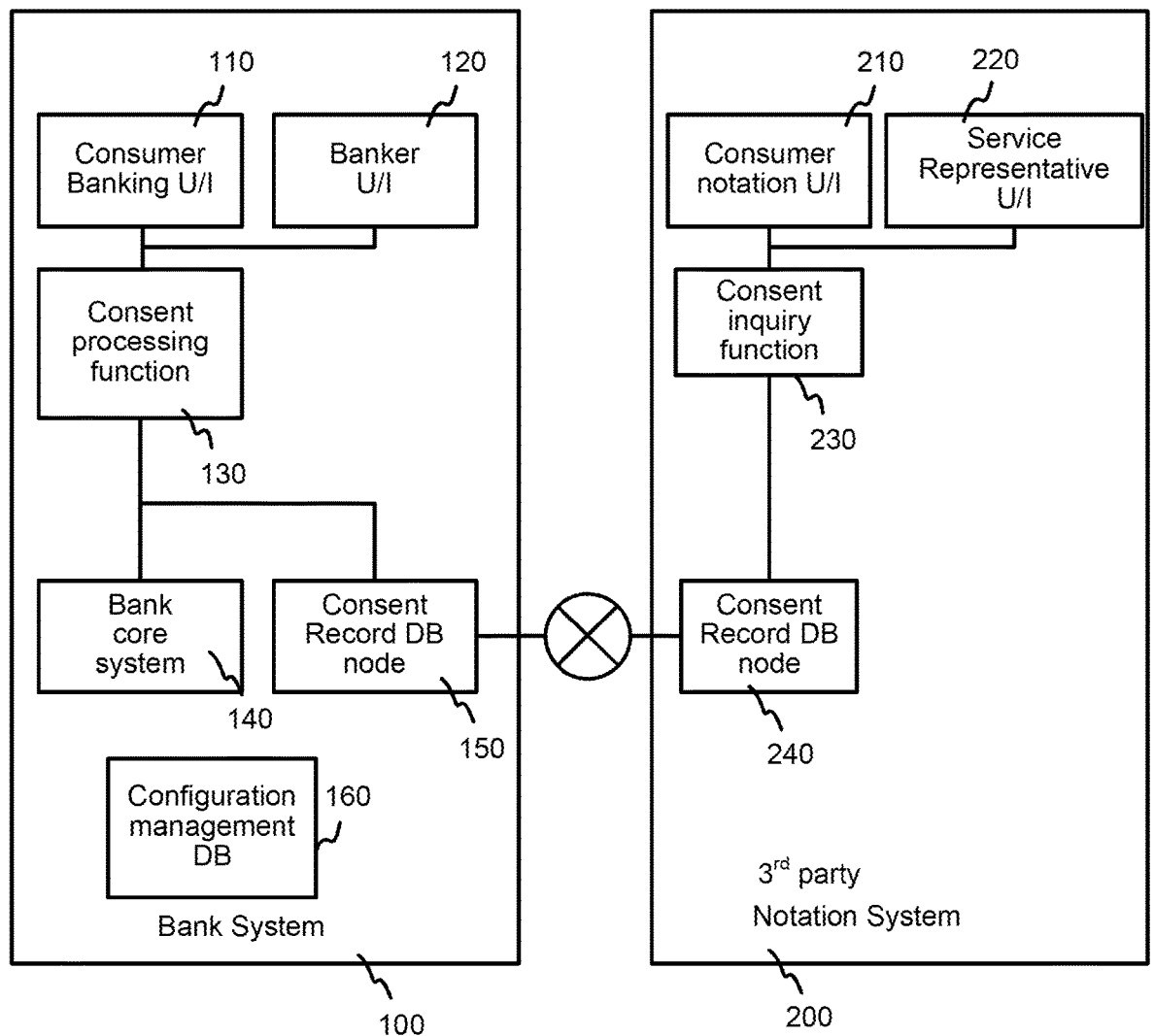
FIG. 1 illustrates an example for sharing the consent record for opening an account, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to generation of consent records to intended organizations or individuals with a guarantee that the records are assured to be consistent with actual business process related to the consent records. Example implementations described herein may utilize blockchain technology, which hitherto is implemented with cryptocurrencies or smart contracts, but can be utilized for sharing information among multiple organizations, neutral arbiters or individuals by a characteristic that a blockchain technology can build a network constructed by multiple nodes that assures the immutability of the recorded data after once the write proposal by a node is accepted by other nodes.

In example implementations described herein, transactions as defined herein involve transactions conducted between the consumer and the bank that can be associated with the blockchain, such as opening an account, transferring/receiving money, indicating what entities to which information can/cannot be shared, modifications of account information, changing agreement terms or consent terms, and any other banking transaction according to the desired implementation.

In example implementations described herein, through the utilization of a block chain, third party verification can be provided and trusted, as the blockchain provides a technological solution that ensure that transactions are verified and recorded consistently between a third party and banking system.

Further, depending on the blockchain implementation utilized, simultaneous generations of transactions can be conducted on the block chain between the banking system and the third party verification system, thereby preventing fraudulent transactions made to the bank core system, as such entries will not exist on the blockchain. In situations where a fraudulent employee of the bank creates bank accounts for a consumer without providing any consent information or without notifying the consumer, such transaction can either 1) only be made to the bank core system, thereby generating an inconsistent record between the bank core system and the blockchain that can be subjected to auditing, or 2) made through the U/I of the employee and posted on the blockchain with evidence of consent, whereupon the transaction can be traced back to the employee and/or verified or invalidated by the third party system. Further, as each transaction in the block chain is associated with consent information, verification and recording of the transactions on the block chain can be traced to the consent information associated with the transaction.

Further, in example implementations, the blockchain of the third party external system can be utilized to conduct audits of the bank core system that handles the opening of accounts and transactions conducted. Such an implementation can flag inconsistencies between the blockchain and the bank core system, and be maintained as a verifiable record against the bank system, thereby preventing the generation of unknown or fraudulent accounts without consent from the consumer.

FIRST EXAMPLE IMPLEMENTATION

In a first example implementation, there are systems and methods that provide sharing consent records which are guaranteed to be consistent with the business process. This ensures that the examiner can collect all required records easily and does not have to doubt the consistency between the record and the actual business process.

FIG. 1 illustrates an example for sharing the consent record for opening an account, in accordance with an example implementation. In this example implementation, there is a bank system 100 and a third party notation system 200. The third party notation system 200 is an external system that can be communicatively coupled to the bank system 100 via a network such as wide area network (WAN). These systems can involve one or more computers connected together and functionalities implemented as hardware embedded in the system or software running in the system. Each of the systems may contain some user interfaces (U/I). Each of the U/I can be implemented as a terminal device that accepts input from the related person, a web service which is provided by a server computer to a computer/device as interactive webpages, a camera or scanner which can scan a printed form and process the filled parts, a voice interpreter that listens to the user voice via microphone device or phone call, a camera which can take the user photo, a biometric authentication device such as fingerprint reader to scan biometric identity of the user or any combination of the above according to the desired implementation.

Bank System 100 can involve a Consumer U/I 110, Banker U/I 120, consent processing function 130, bank core system 140, consent record database (DB) node 150 and configuration management DB 160.

The 3rd party notation system 200 is a system configured to provide accessibility to the consent information for appropriate individuals or organizations. The 3rd party notation system 200 can include consumer U/I 210, service representative U/I 220 and consent record DB node 240. In example implementations, the consent record DB node 150 and the other consent record DB node 240 are connected to share the consent records.

The consumer banking U/I 110 is configured to accept information related to the opening of the account which are expected to be provided by the consumer. The information can involve consumer personal information, evidence which certifies the identity of the consumer and authenticity of the provided personal information, or optional items related to the agreement for opening an account or any combination of the above. The consumer U/I 110 can be implemented as an automated teller machine (ATM), a terminal machine in a bank, a web service provided to the consumer devices by the bank, or any other method in accordance with the desired implementation. An example of the consumer banking U/I 110 as a web page is shown in FIG. 2. If the consumer banking U/I 110 is implemented as webpages or as any other subsystem that interacts with the consumer device, the consumer banking U/I 110 may collect the digital fingerprint of the consumer device, which can involve some information that can be utilized to identify the device and/or the device state.

FIG. 2 illustrates an example of a consumer banking user interface, in accordance with an example implementation. As illustrated in FIG. 2, the consumer banking U/I 110 may include fields for inputting personal information such as first name, last name, birthday, and so forth according to the desired implementation, identification information such as photo ID, a selection for the account type (e.g., checking, saving), a particular plan for the account (e.g., plan A, plan B), a checkbox for terms and conditions, and so on according to the desired implementation.

The banker U/I 120 accepts information from a bank representative, who may introduce the bank service to a consumer to procure consent to the bank service. The information can be same as that for the consumer banking U/I 110, but the banker U/I 120 can further include a copy of agreement document signed by the consumer. The banker U/I 120 can also accept proof or evidence for the agreement from the consumer. The proof or evidence is maintained to make sure the consent is made by both the bank representative and the consumer, so not only by the bank representative. The proof can include the signature of the consumer or evidence of validation for the documents regarding a debit-card and personal identification number (PIN). Such proof or evidence can be converted to digital evidence if needed.

Figure 3:
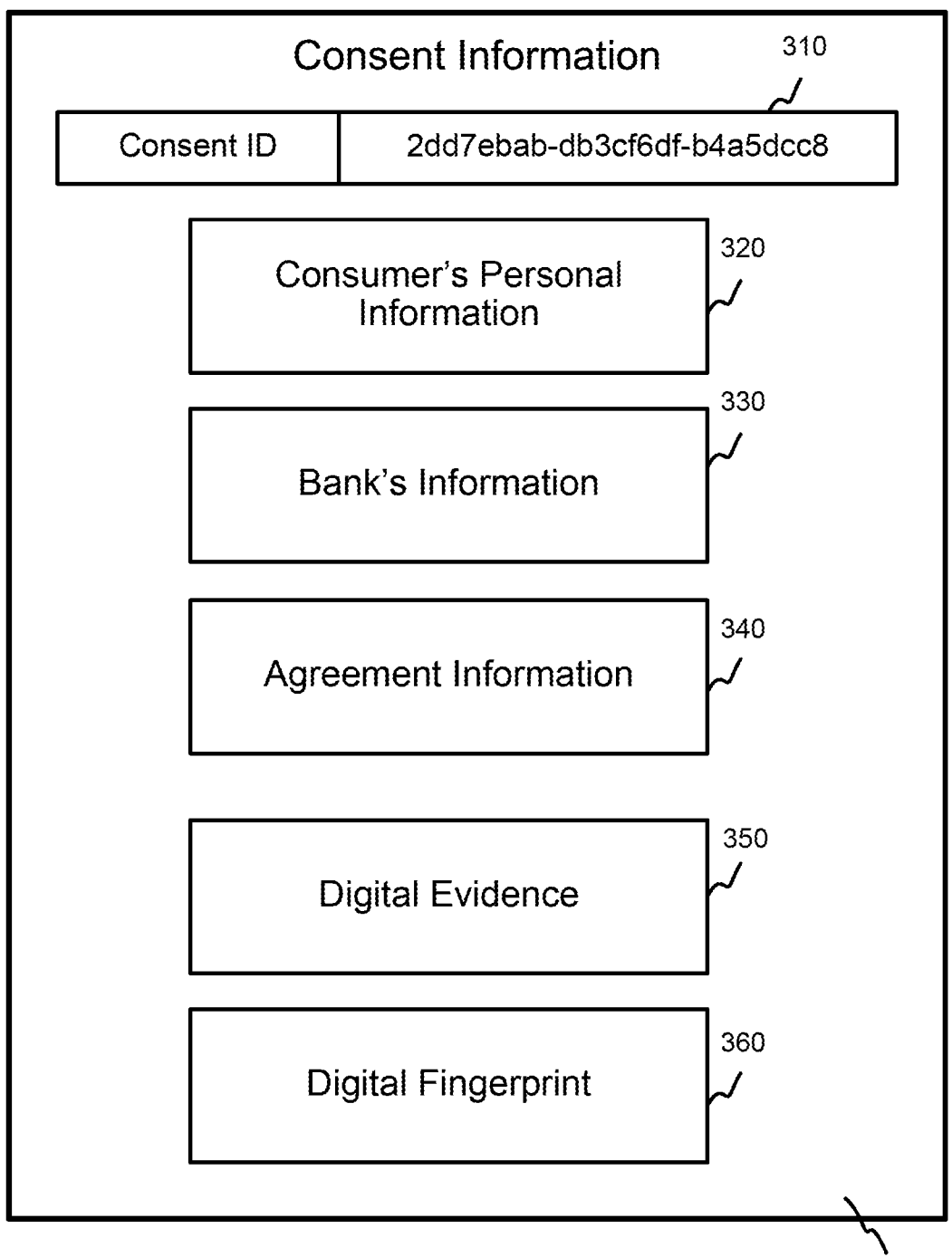
FIG. 3 illustrates an example of consent information for opening a bank account, in accordance with an example implementation.

The banker U/I 120 and the consumer banking U/I 110 can be configured to construct consent information 300 from the information provided by the consumer or the bank representative. FIG. 3 illustrates an example of consent information for opening a bank account, in accordance with an example implementation. The consent information 300 can include the consent ID 310 (e.g., involving a unique number for the consent), consumer personal information 320, bank information 330 and agreement information 340. The consent information 300 may also contain one or more pieces of digital evidence 350.

FIG. 4 illustrates an example of consumer personal information 320, in accordance with an example implementation. Consumer personal information 320, as illustrated in FIG. 4, describes the consumer as a part of the consent. The information involves information to determine the consumer, to make contact to the consumer and to validate the consumer credentials as a customer of the bank. Such fields of personal information can include the name, birthday, residential address, phone number, e-mail address, social security number or any other identical number on government-issued IDs in accordance with a desired implementation.

Figure 5:
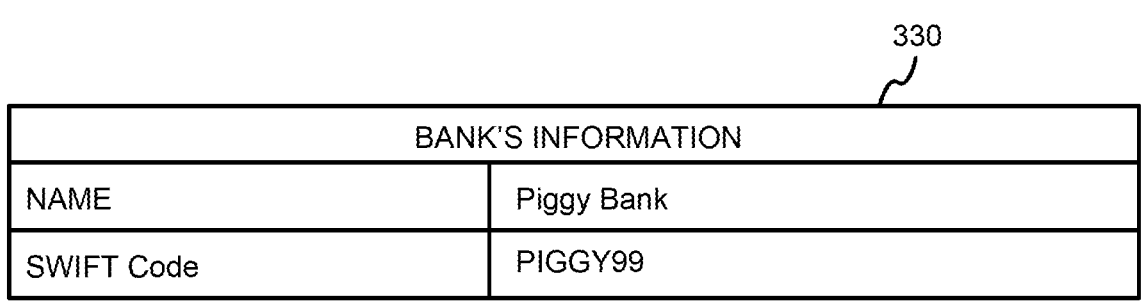
FIG. 5 illustrates bank information, in accordance with an example implementation.

FIG. 5 illustrates bank information, in accordance with an example implementation. The consent information 300 may contain the bank information 330, shown in FIG. 5, such as the name and/or any other identical information such as SWIFT code. The bank information 330 can be copied from the static value stored in U/I 210 or 220, in accordance with an example implementation.

FIG. 6 illustrates agreement information 340, in accordance with an example implementation. Agreement information 340 describes the agreement and variables of the agreement. The variables can include information such as acceptance or declination of optional services, effective/end date of the agreement, or amount of fees or benefits if exist. The description of the agreement can be replaced with information which can deterministically specify the content, such as logical location of a digital document that is set to be immutable, and/or hash code of the digital document. Other examples of agreement information can include the type of account, the document version, the type of agreement, and any plan or other account related information in accordance with the desired implementation.

Figure 7:
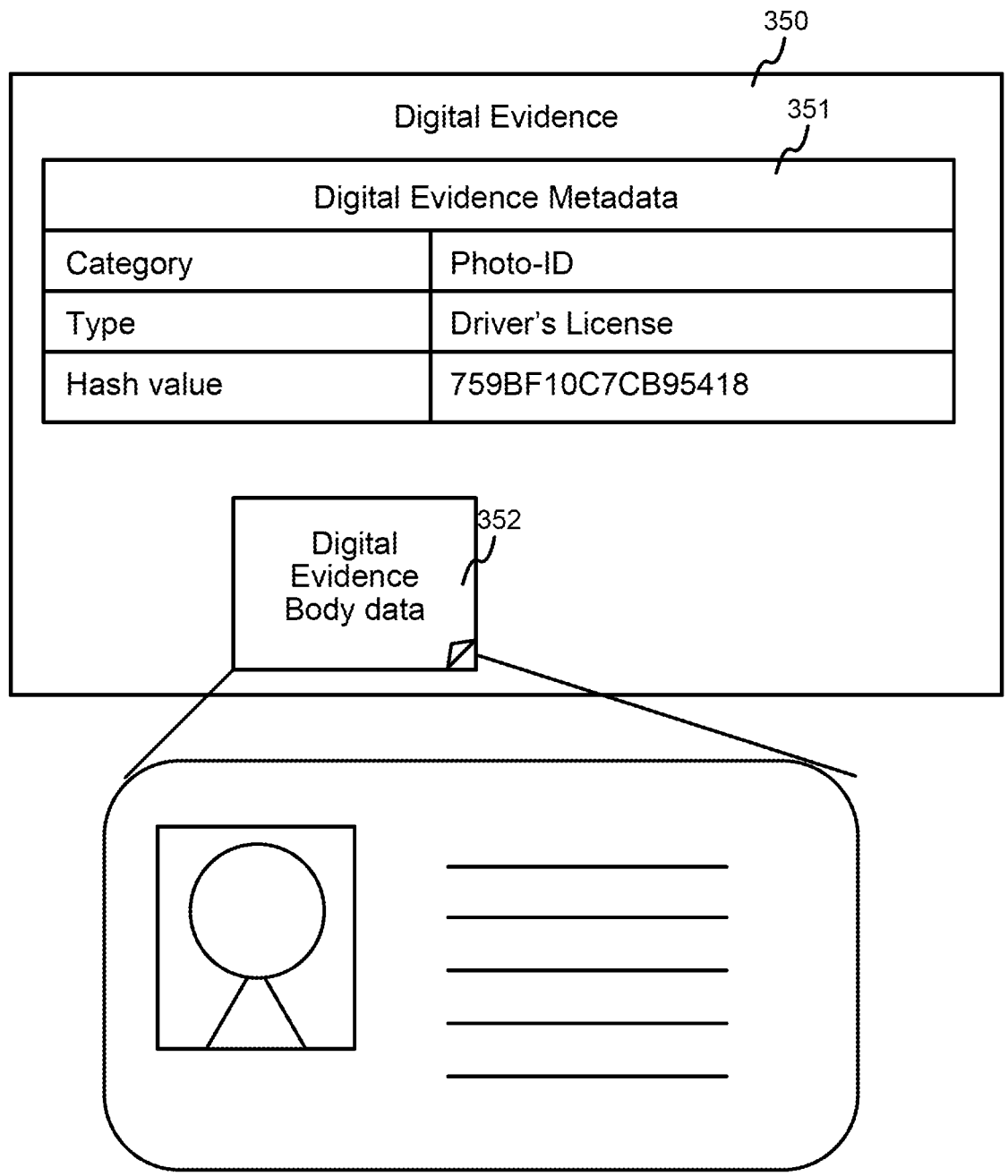
FIG. 7 illustrates examples of digital evidence, in accordance with an example implementation.

FIG. 7 illustrates examples of digital evidence, in accordance with an example implementation. As illustrated in FIG. 7, the consent information 300 can also contain some pieces of digital evidence 350, such as a copy of a form or a copy of a photo-ID of the consumer for identification, a copy of a printed form with signatures for proof or evidence of agreement, a photo of the consumer taken by Consumer Banking U/I 110 or Banker U/I 120, a recorded voice which mentions the consent or biometric information taken by the Consumer's Banking U/I 110 or Banker's U/I 120, and so on depending on the desired implementation. Each piece of evidence can be handled as a combination of digital evidence metadata 351 and digital evidence body data 352. The digital evidence metadata 351 is a description of the digital evidence body data 352. The digital evidence metadata 351 may contain categories, types and, depending on the desired implementation, a content-unique value, such as hash value of the data, to prevent falsification.

Figure 8:
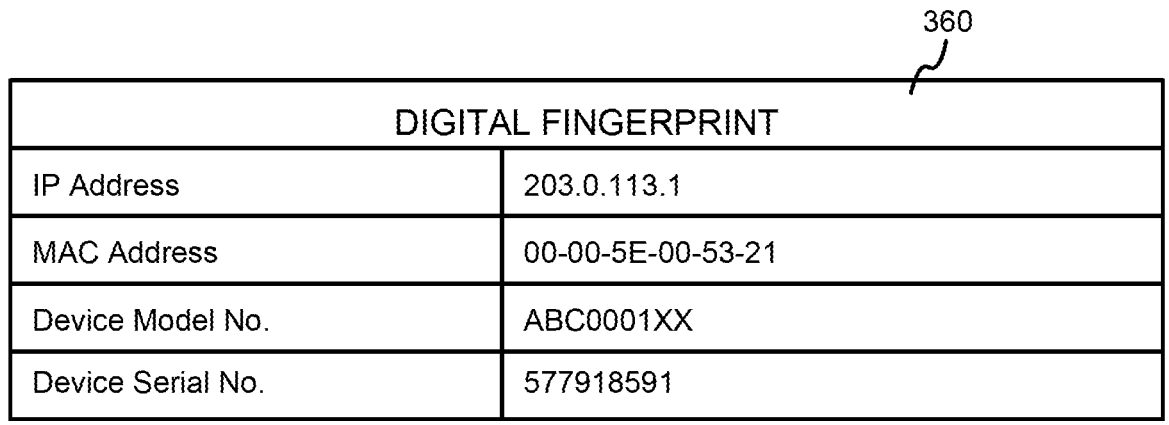
FIG. 8 illustrates an example of a digital fingerprint, in accordance with an example implementation.

FIG. 8 illustrates an example of a digital fingerprint, in accordance with an example implementation. The consent information 300 can also contains a digital fingerprint 360, which is information to identify the consumer's device and its condition at the time consent is made. As illustrated in FIG. 8, the digital fingerprint 360 can include the device internet protocol (IP) or other network address, the network device or media access control (MAC) address, the device model number and serial number, or any combinations of such information that describes the device identity and status.

The consent processing function 130 is a function which accepts the consent information from consumer banking U/I 110 or from banker U/I 120 and then, based on the consent information, instructs the bank core system 140 to conduct required tasks related to the consent information and also instruct consent record DB node 150 to store the consent record. For example, as the consent information is for opening account in this example implementation, the consent processing function 130 instructs the bank core system 140 to create a new account record associated with the consumer described in the consent information, and forwards the consent information to the consent record DB node 150 to store the information as a record. Note that the consent processing function 130 ensures that the consent information is reflected to both the bank core system 140 and the consent record DB node 150, or not at all. The consent processing function 130 can be implemented with rollback technique or atomic processing technique to achieve such an "all or nothing" characteristic.

The bank core system 140 is an internal system that manages consumer accounts. Further, the bank core system 140 holds the balances of each account, accepts and executes transactions such as deposit, withdrawal or money transfer.

The consent record DB node 150 is a shared database which is coupled or associated with consent record DB node 240 in 3rd party notation service 200. The consent record DB node 150 and the consent record DB node 240 ensure that once a record is "written" on the consent record DB node 150 (e.g., the consent record DB node 150 indicates "success" in response to the write request), the record is also available on the consent record DB node 240.

The configuration management DB 160 stores records of modifications applied to the whole or a part of bank system 100. The configuration management DB 160 at least stores records of modifications related to consent processing function 130, bank core system 140 and consent record DB node 150. All modifications related to the components are recorded so that any malicious modifications to break the consistency among bank core system 140, consent record DB 150 and another consent record DB 240 are, if such records exist, recorded and considered to be a subject to audit.

In the 3rd party notation system 200, service representative U/I 220 accepts inquiries for consent records from a representative of the 3rd party notation organization. The service representative U/I 220 can be a terminal device or a web service which representative authenticates the representative to grant access to required consent information. The consumer notation U/I 210 can also be a terminal device or a web service, which accepts the consumer identity information and shows consent information related to the consumer.

Figure 9A:
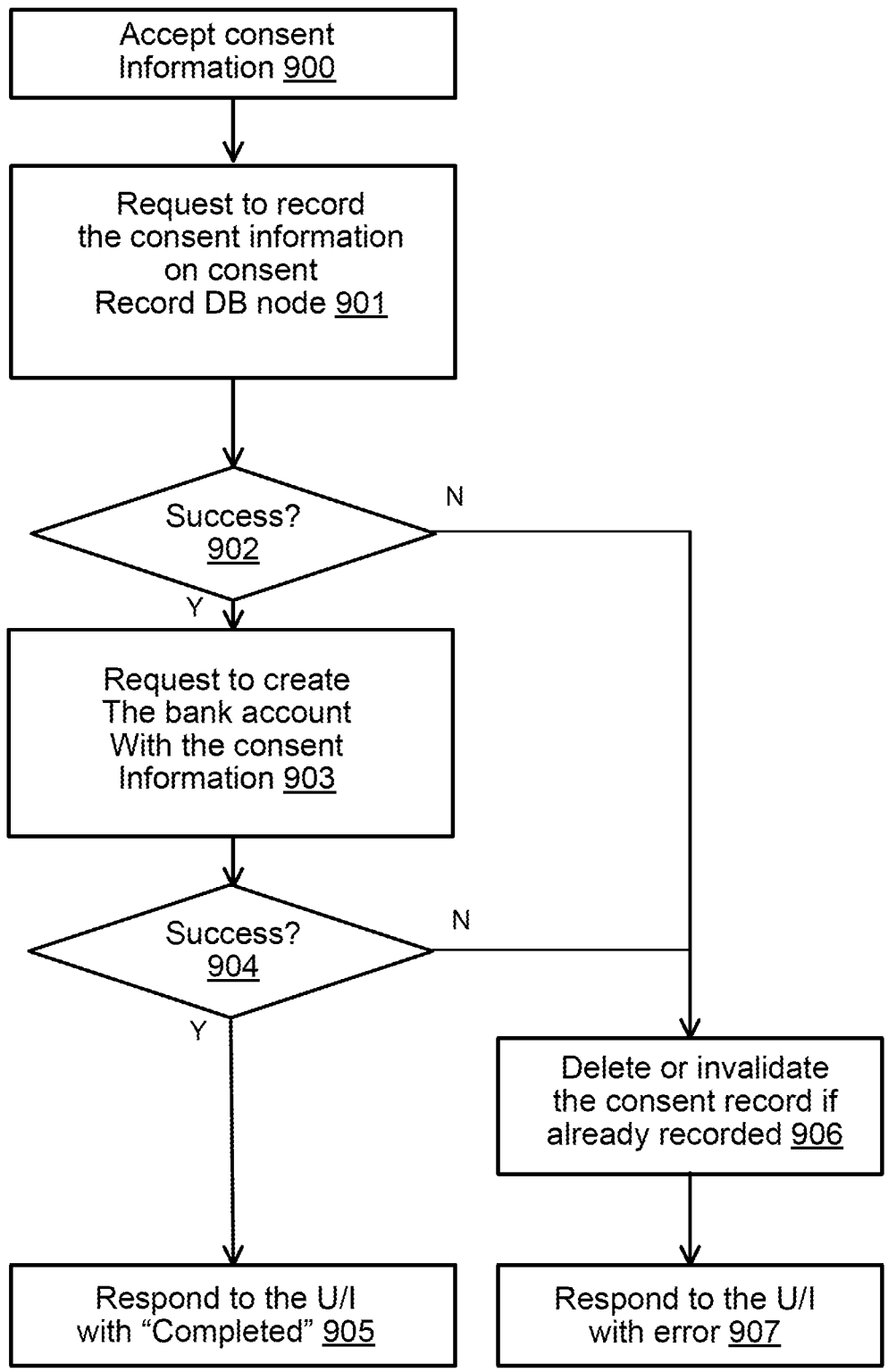
FIG. 9(*a*) illustrates an example flow of the consent processing function 130, in accordance with an example implementation.
Figure 9B:
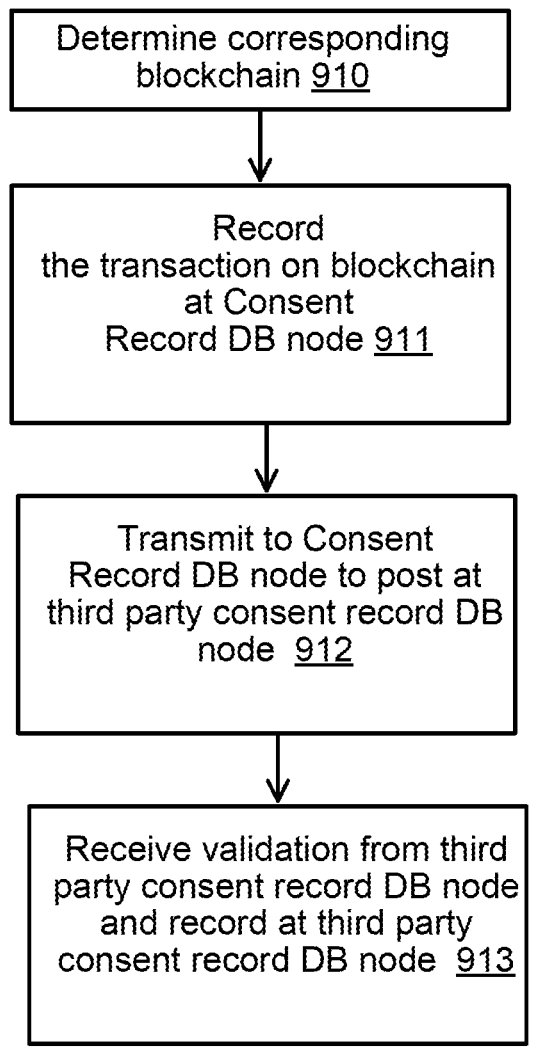
Figure 9C:
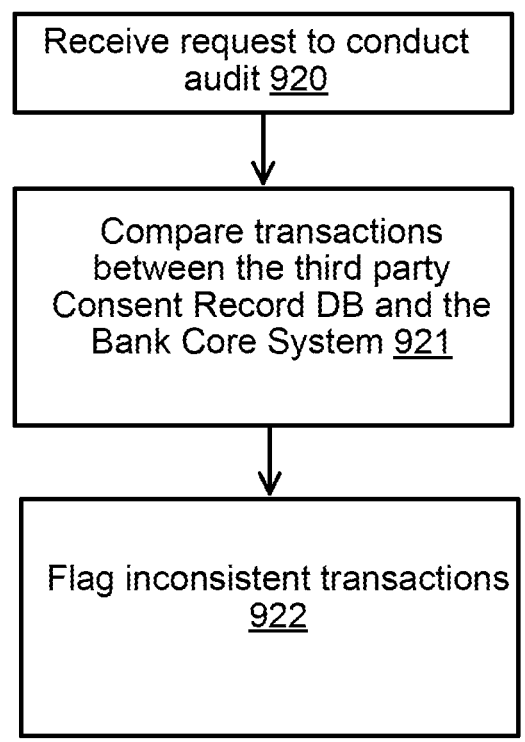

FIG. 9(*a*) illustrates an example flow of the consent processing function 130, in accordance with an example implementation. At 900, the consent processing function 130 accepts consent information from Consumer U/I 110 or Banker U/I 120. Then at 901, the consent processing function 130 attempts to store the consent information into Consent record DB node 150, and a determination is made at 902 as to whether the storage of consent information was successful at 902. Once the consent record DB node 150 responds that the consent information has been successfully stored in the consent record DB node 150 (Y), then the consent processing function 130 proceeds to 903 and requests the bank core system to create an account based on the consent information, otherwise (N) the flow proceeds to 906. An example of a request can be, but is not limited to, creating some fields to store account information inside the bank core system 140 to prepare for future requests for retrieving the account information, deposit, withdrawal, money transfer orders or any other orders related to the account. At 904, a determination is made as to whether the request has succeeded. If the request succeeds (Y), then the flow proceeds to 905, wherein the consent processing function 130 can respond to the Consumer U/I 110 or Banker U/I 120 that the consent information has been successfully processed and effective. Otherwise (N), the flow proceeds to 906 wherein the consent record is deleted or invalidated, and then proceeds to 907 to send an error message. The consent record can be deleted or invalidated if no validation is received for recording the request or account from the third party notation system (e.g., network between bank system and third party system goes down), the third party notation system transmits a response indicating that the transaction is invalid, or so on, depending on the desired implementation.

FIG. 9(*b*) illustrates an example of recording a transaction in a blockchain, in accordance with an example implementation. The transaction can be directed to a creation of a new account as described in FIG. 9(*a*) as shown at the flow at 903, and for any subsequent transaction therein. At 910, the flow begins by determining a corresponding blockchain for the transaction to be posted. If no blockchain exists, a new blockchain may be created. The determining of the corresponding blockchain can be conducted through determining the corresponding blockchain to account information through any desired implementation. At 911, the transaction is recorded at the consent record node DB 150 of the bank system and then a communication is submitted to the consent record node DB 240 through the network according to any desired blockchain implementation at 912. At 913, once validation is received from the third party system, the transaction is validated by the consent record node DB 240 and recorded in the blockchain. The transaction may include the consent information as described herein.

FIG. 9(*c*) illustrates an example of an audit, in accordance with an example implementation. An audit can be requested for a particular account through consumer notation U/I 210, service representative U/I 220, or can be conducted periodically, or can be conducted through any desired implementation. At 920, the consent inquiry function 230 receives request to conduct an audit. At 921, the transactions or entries in the blockchain as recorded by consent node DB 240 is compared to the transactions as recorded in the bank core system 140. At 922, inconsistent or non-matching transactions are flagged by the consent inquiry function 230, and can be provided through consumer notation U/I 210 or service representative U/I.

Figure 10:
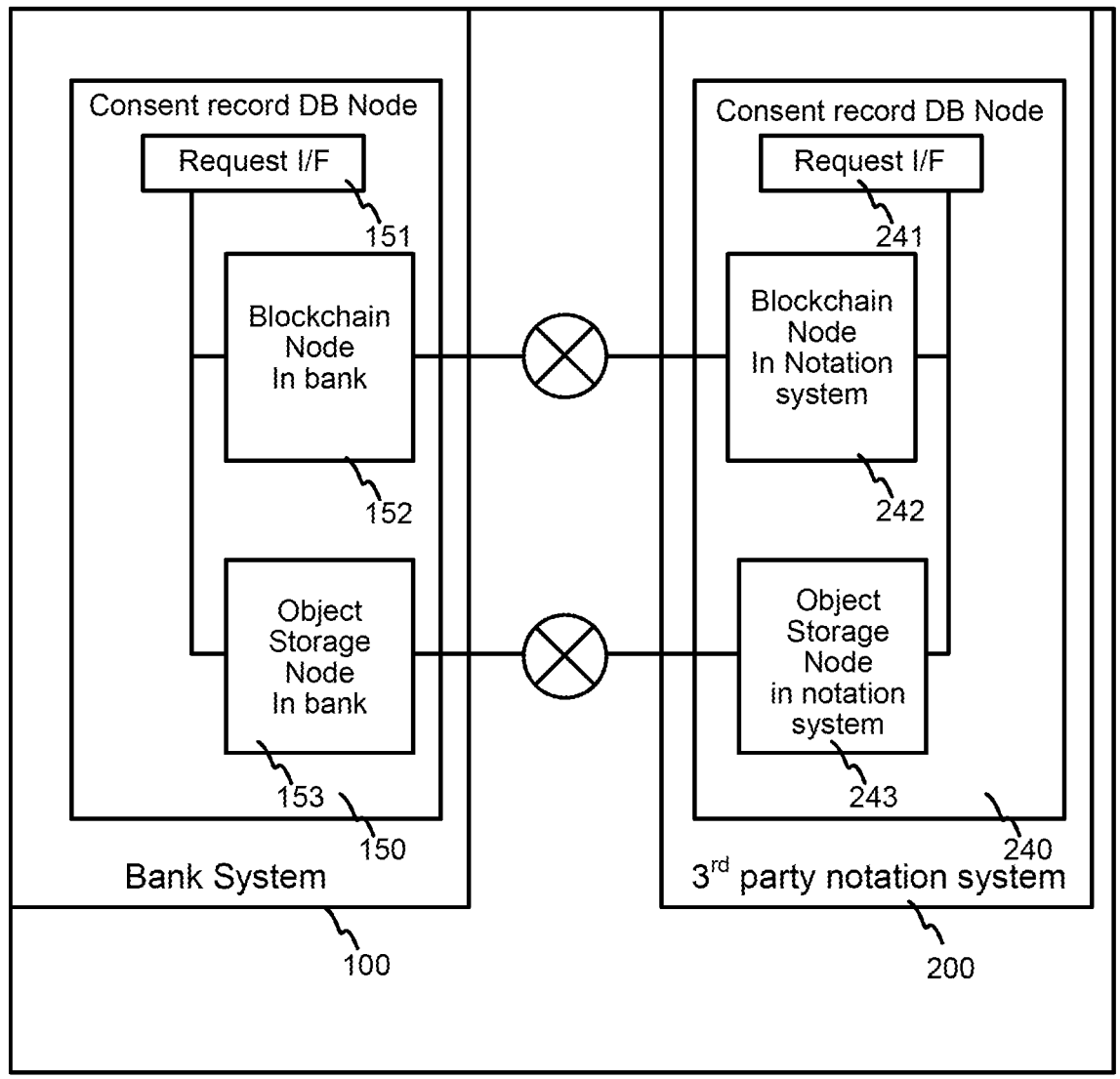
FIG. 10 illustrates an example of internal structure of the Consent record DB node and consent record DB node, in accordance with an example implementation.

FIG. 10 illustrates an example of internal structure of the Consent record DB node 150 and consent record DB node 240, in accordance with an example implementation. Depending on desired configuration of the DB nodes for the example implementation, the consent record DB node 150 may contain request interface (I/F) 151, blockchain nodes 152 and object storage node 153. In the same manner, consent record DB node 240 may contain a request I/F 241, blockchain nodes 242, and object storage nodes 243. Depending on the desired implementation, there can be several variations of implementations from that of FIG. 10. For example, some of the variations can involve omitting either of the object storage nodes or blockchain nodes, or replacing the object storage nodes with any network-attached storage implementations such as filer or storage area network (SAN) storage systems. The blockchain nodes 152 and 232 can be a part of a blockchain network, which provides immutability and resistance against silent modification. The relationship between object storage nodes 152 and 242 can be a synchronized pair, client and server, or any other relationships that object storage node 152 can accept the write request and the content can be read from object storage node 242.

Figure 11:
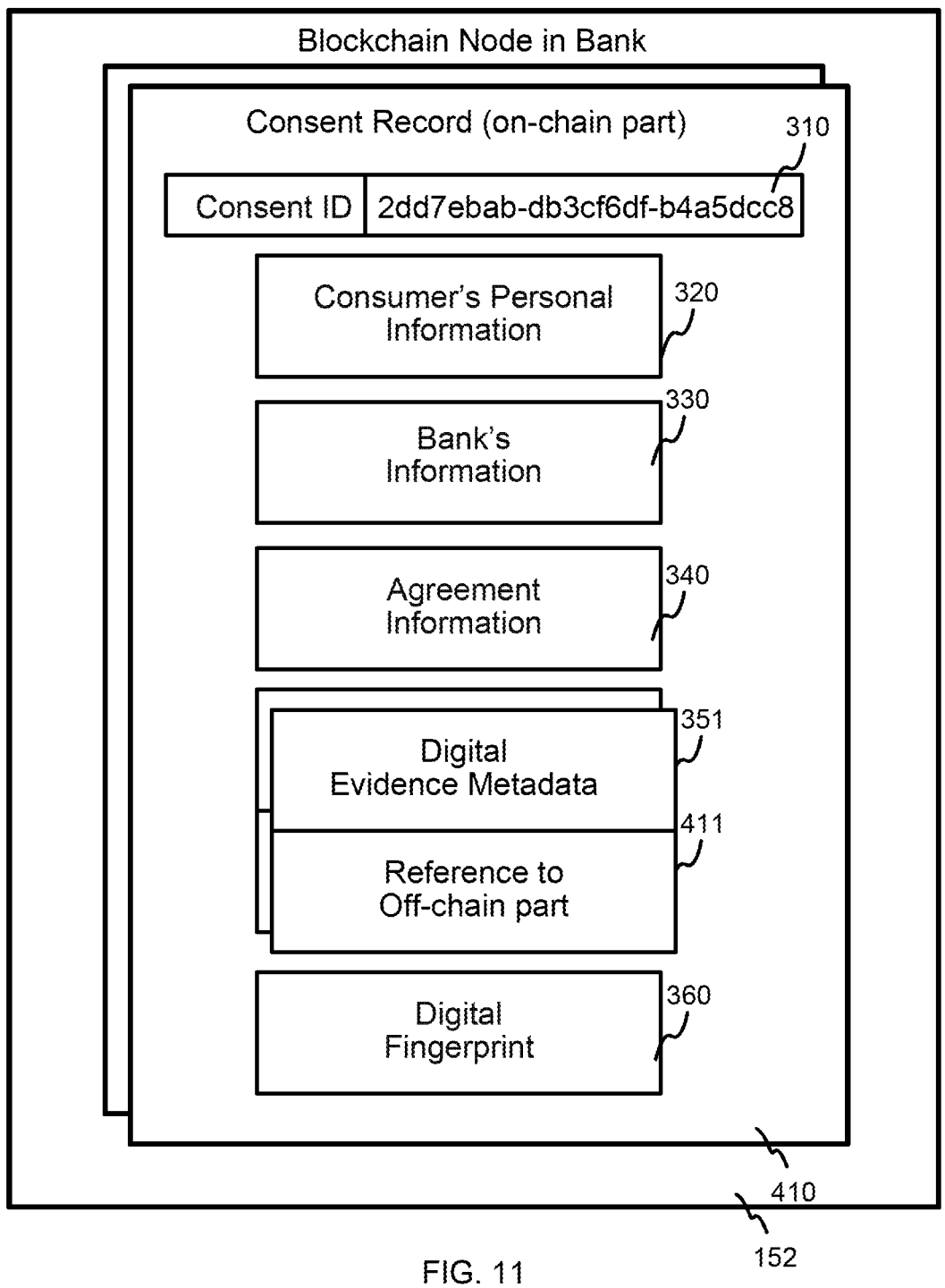
FIG. 11 illustrates a blockchain node in a bank, in accordance with an example implementation.

FIG. 11 illustrates a blockchain node in a bank, in accordance with an example implementation. In the case that the consent record DB nodes are configured to have both blockchain nodes and object storage nodes, the consent information passed from consent processing function 130 to request I/F 151 are divided to on-chain part 410 and off-chain part 420. As shown in FIG. 11, on-chain part 410 can contain consent ID 310, consumer personal information 320, bank information 330, and agreement information 340. The on-chain part 410 may contain information related to digital evidence 350 such as digital evidence metadata 351 and reference to off-chain part 411, which expresses logical location of off-chain part 420 mentioned with respect to FIG. 12.

Figure 12:
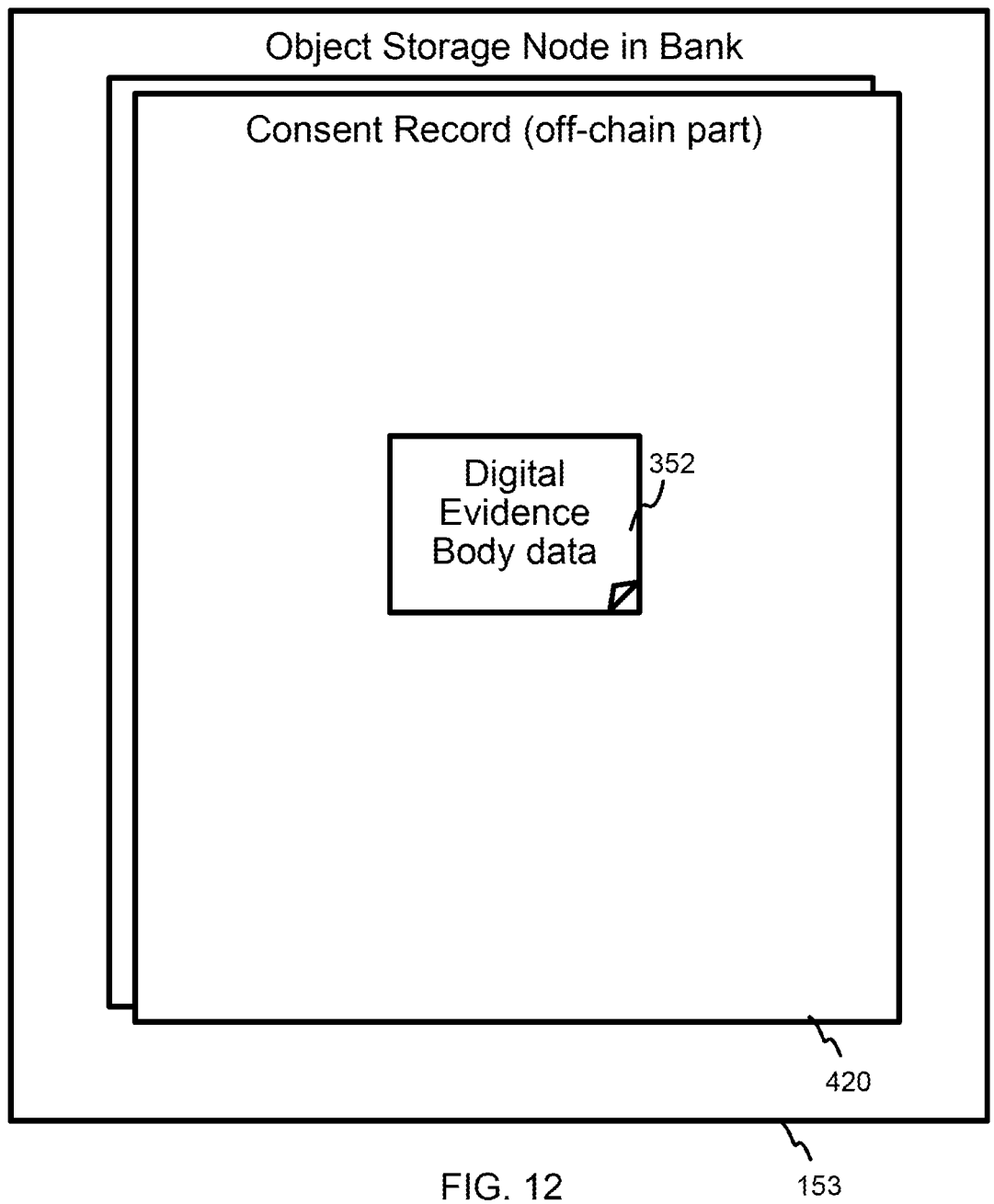
FIG. 12 illustrates an off-chain part for the object storage node in a bank, in accordance with an example implementation.

FIG. 12 illustrates an off-chain part 420 for the object storage node in a bank 153, in accordance with an example implementation. Off-chain part 420 contains digital evidence body data 352. In this example implementation, the request I/F 151 constructs off-chain part 420 from the digital evidence metadata 351 in the consent information 300 and stores the off-chain part 420 into object storage node 153 in bank. The storing behavior can be replaced with a request to object storage node 243 in notation system if the object storage node 153 and 243 are configured as client-server model. After the off-chain part 420 is stored, the request I/F 151 constructs on-chain part from the consent information 300 and the logical location of the off-chain part 420 in object storage node 153, which is provided by the object storage node 153 after the successful storing of off-chain part 420. Then, the request I/F 151 stores the on-chain data 410 into the blockchain network through the blockchain node 152. The procedures to store the on-chain part 410 into blockchain network may also involve a process to confirm that the on-chain part 410 is accepted and validated by the other nodes in the blockchain network so that the on-chain part 410 is confirmed to be stable in the blockchain network.

In the case that the DB nodes are configured to have only blockchain nodes, all data are stored into the blockchain nodes. In the case that the DB nodes are configured to have only object storage nodes, all data are stored into the object storage nodes.

FIG. 13 illustrates a matching consent record, in accordance with an example implementation. In the 3rd party notation system 200, Consumer notation U/I 210 accepts a consumer request to query consent records related to the consumer. The consumer notation U/I 210 accepts the user personal information as a part of personal information to construct query, and the consumer notation U/I 210 tries to authenticate the user by one or more methods (e.g., having questions for the consumer name, birthday and any other attributes of the consumer, taking photo of the user, scanning and analyzing the user's photo-ID, taking biometric data such as fingerprints and any other methods commonly used to authenticate an individual according to the desired implementation). The consumer notation U/I 210 can construct a query from the user input and issue the query to the consent inquiry function 230 to see if any consent records in the consent record DB node 240 have personal information which matches the query. If any record is found, the consumer notation U/I 210 shows the matched consent record as shown in FIG. 13.

Service representative U/I 220 accepts inquiries for consent records with some required authentication, which can be implemented through logging-in with account name and password issued by the notation system. Such implementations ensure that the consent records are only disclosed to limited person who are regarded to have the right to access the records for their role in the notation servicer. The inquiries can contain some conditions. The condition can be a part of the consumer personal information such as combinations of name and birthday, type of the agreement and any other conditions that can be related to the content of the consent record. The service representative U/I 220 constructs a query including the information and forwards the query to consent inquiry function 230. The consent inquiry function 230 executes the query via the consent record DB node 240, gets responses from the DB node 240, and then outputs the result.

The request I/F 241 in the 3rd party notation system 200 accepts and responds to requests for the recorded consent information from the consumer notation U/I 210 or the service representative U/I 220. In case that the consent record DB node 240 is configured to contain both object storage node 242 and blockchain node 243, the request I/F 241 searches the on-chain parts of the consent records from the blockchain node 233 which meets the query, gathers off-chain parts pointed by the reference to off-chain part 411 from the object storage node 242, and then combines the parts and responds to the request with the combined consent records. By the example implementations described above, the consumer can retrieve his/her consent records about the account creation via 3rd party notation service, which ensures that the consent record is guaranteed to match with the bank's business operation.

SECOND EXAMPLE IMPLEMENTATION

Figure 14:
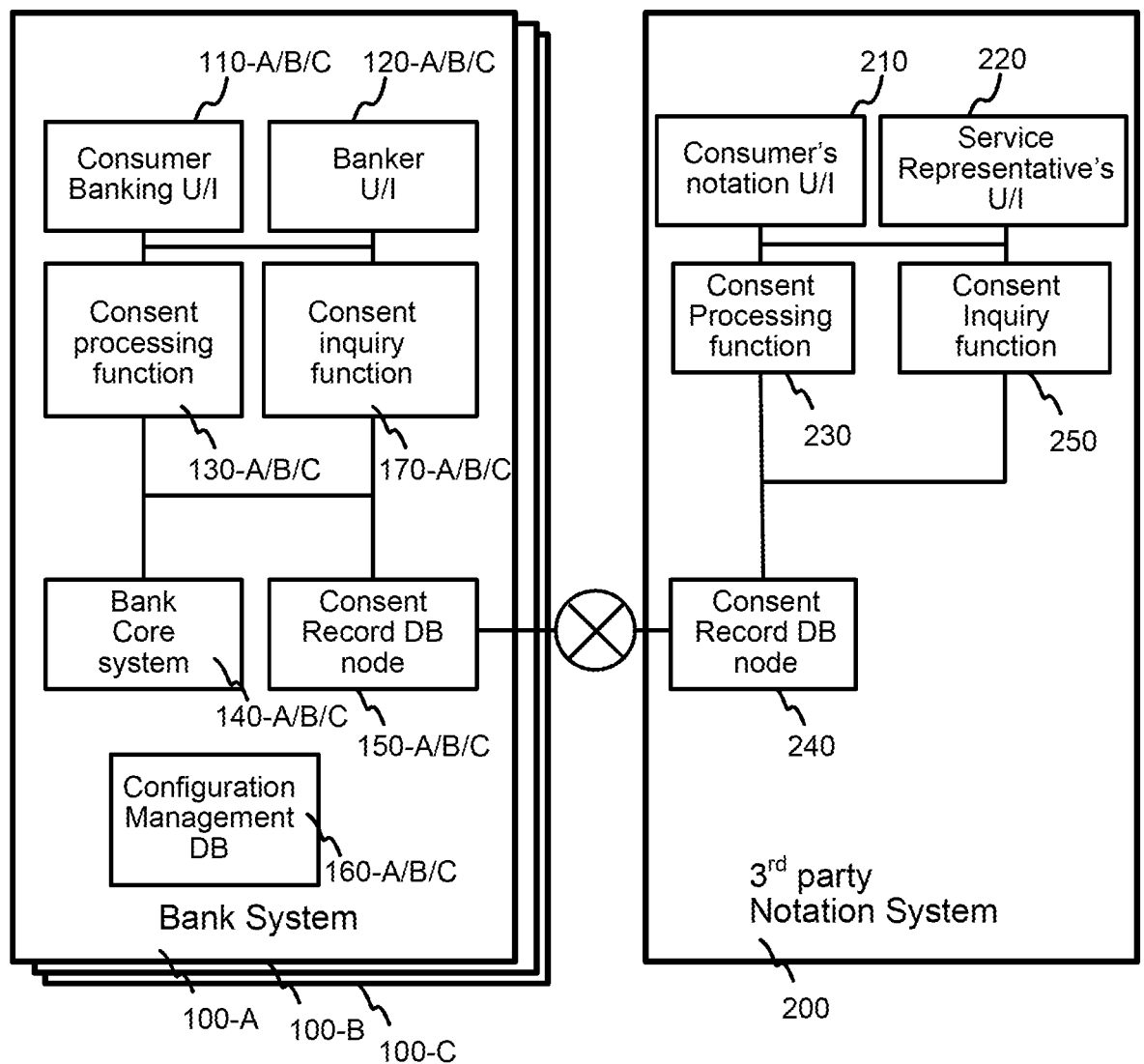
FIG. 14 illustrates an example implementation involving multiple bank systems.

In a second example implementation, the system is utilized not only for disclosing the consent record to the consumer but also for sharing the consent records among multiple banks to find suspicious attempts to open bank account with fake identity. FIG. 14 illustrates an example implementation involving multiple bank systems. As shown in FIG. 14, the differences from the second example implementations are that there are two or more bank systems 100-AB/C, wherein each bank system 100-A/B/C has its own consent inquiry function 170-AB/C, and 3rd party notation system 200 has a consent disclosure function 250. Each bank system may also involve its own consumer banking U/I 110-AB/C, banker U/I 120-AB/C, consent processing function 130-AB/C, bank core system 140-AB/C, consent record DB node 150-AB/C, and configuration management system 160-AB/C.

In the second example implementation, consumer notation U/I 210 includes functionality to grant 3rd-party banks access to the consent record. For example, the consumer notation U/I 210 implemented as a webpage can not only shows the content of the consumer consent record, but can also involve a "Disclose" button. When such a button is clicked by the consumer, the notation U/I 210 requests consent disclosure function 250 to disclose the consumer record. There can be options provided for the consumer to choose the subject to disclosure or to choose the 3rd party bank which are to be granted to access the record.

Figure 15:
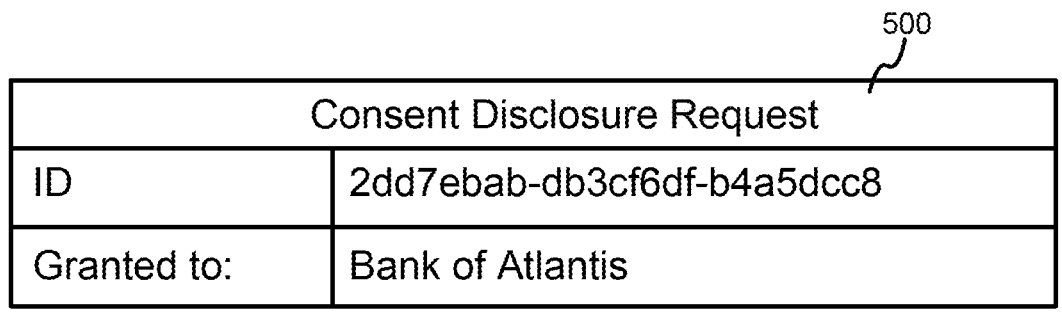
FIG. 15 illustrates an example of a consent disclosure request, in accordance with an example implementation.
Figure 15:
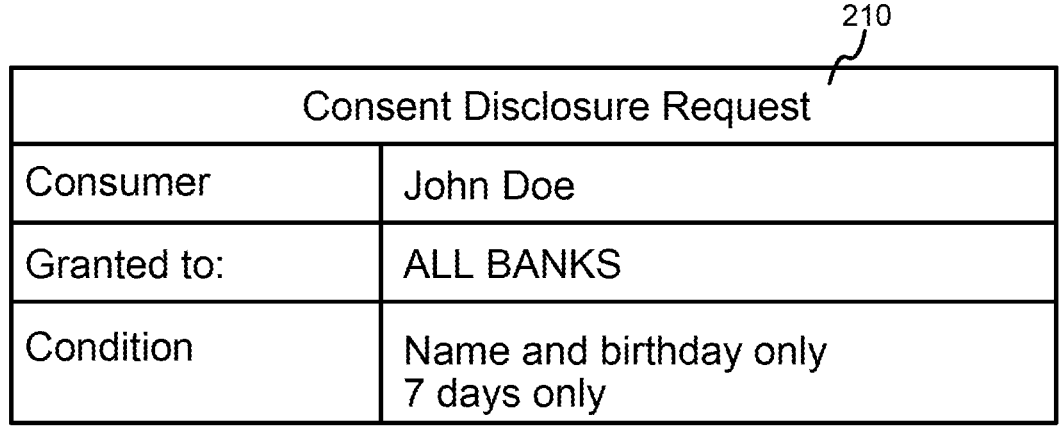

FIG. 15 illustrates an example of a consent disclosure request, in accordance with an example implementation. The consent disclosure function 250 accepts a disclosure request 500, shown in FIG. 15, from consumer notation U/I 210. The consent disclosure request 500 may contain information to identify the IDs of consent records subject to disclosure or identification information of the consumer, and identification information of the 3rd party bank which are to be granted to access the record as illustrated in FIG. 15, but is not limited thereto, and can be adjusted according to the desired implementation. For example, the consent disclosure request 500 may contain the identification information of the consumer instead of the consent ID to specify all consent records related to the consumer. The consent disclosure request 500 may also contain some conditions to limit the disclosure, such as time period or requesting some part of the consent record.

Once the consent disclosure function 250 accepts the request, the consent disclosure function 250 modifies the consent record DB 240. The modification is based on the configuration of the DB node 240 and consent record DB 150-AB/C. In case that the consent record DB 150-A/B/C and 240 are implemented as server-client model object storage, the limitation can be implemented in consent record DB node 240 to deny access from consent record DB node 150-A for the consent record, and the modification on the consent record DB 240 can be to modify the permission to grant access from consent record DB 150-A to the consent record of the ID in the consent record DB 240. In case that the consent record DBs are implemented to contain blockchain nodes or shared object storage, the limitation can be also implemented in consent record DB node 240 to exclude consent record DB node 150-A from sharing some of the consent records that are not intended to be disclosed to the bank by bank system 100-A, and the modification on the consent record DB node 240 can be adding consent record DB node 150-A as a peer to share the consent record with specified ID.

Similar to the limited-sharing methodology, the limitation can also be implemented that all the consent records are shared to all nodes as encrypted data, which can be decrypted with a key only shared to limited nodes. In this case, the modification can be providing an decryption key from consent record DB node 240 to consent record DB 150-A or providing the consent record as re-encrypted by another encryption key which is paired with a decryption key consent record DB 150-A have.

The consent inquiry functions 170-A/B/C are functions to retrieve consent records stored in consent record DB node 150-AB/C. In bank system 100-A, the consent inquiry function 170-A has a similar functionality to consent inquiry function 230 in 3rd party notation system 200, but the difference is that the consent inquiry function 170-A only retrieves consent records that are subject to disclosure to the organization of bank system 100-A.

Variations to the second example implementation are also possible depending on the desired implementation. For example, if the consumer agrees on consumer banking U/I 110 with providing the consumer consent record to other banks as a part of the consent, then the consumer banking U/I 110 constructs consent information including the agreement, whereupon the consent information is stored in consent record DB node 240 through consent record DB node 150. Then, consent disclosure function 250 discloses the consent record to other banks without any request from consumer notation U/I 210 but by detecting the agreement for disclosure stored in the consent record.

THIRD EXAMPLE IMPLEMENTATION

In a third example implementation, money transfer order records are aggregated to find suspicious money flow such as money laundering. In this example implementation, consumer banking U/I 110 or banker U/I 120 accepts a money transfer order, which can involve a request to transfer some amount of money from specified bank account to another.

FIG. 16 illustrates an example of consumer banking U/I 110 as a webpage, in accordance with an example implementation. FIG. 17 illustrates example of agreement information for a money transfer, in accordance with an example implementation. The consent information 300 contains agreement information of money transfer 370, shown in FIG. 17, instead of the agreement information 340 shown as FIG. 6. The agreement information of money transfer 370 can include identification information of the source account, destination identification information of the destination account, date of the transfer and amount to be transferred. Consumer banking U/I 110 or Banker U/I 120 constructs consent information 300 of the money transfer order, and then the U/I sends the information to the consent processing function 130. Such consent information is processed by consent processing function 130 to store the consent information into consent record DB node 150 as a consent record and requests money transfer order to bank core system 140, as the same manner as those written in FIG. 5 except that the procedures are not for creating account but for making the money transfer order effective.

Figure 18:
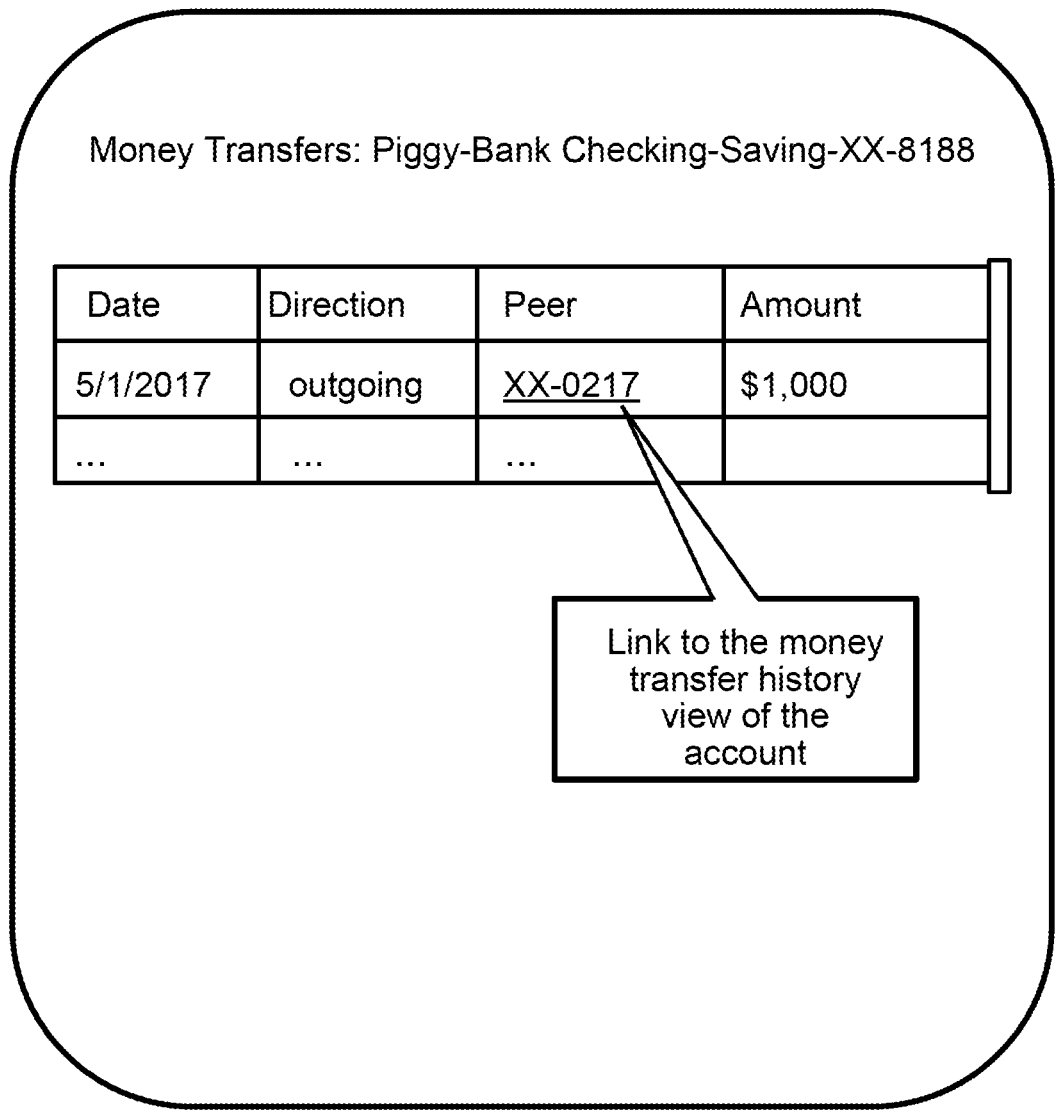
FIG. 18 illustrates an example of money transfer history, in accordance with an example implementation.

The stored consent record is accessed from consumer notation U/I 210 or service representative U/I 220 via consent inquiry function 230. FIG. 18 illustrates an example of money transfer history, in accordance with an example implementation. As illustrated in FIG. 18, the money transfer history can illustrate a list of incoming and outgoing transfers, as well as a link to a money transfer history according to the desired implementation.

Figure 19:
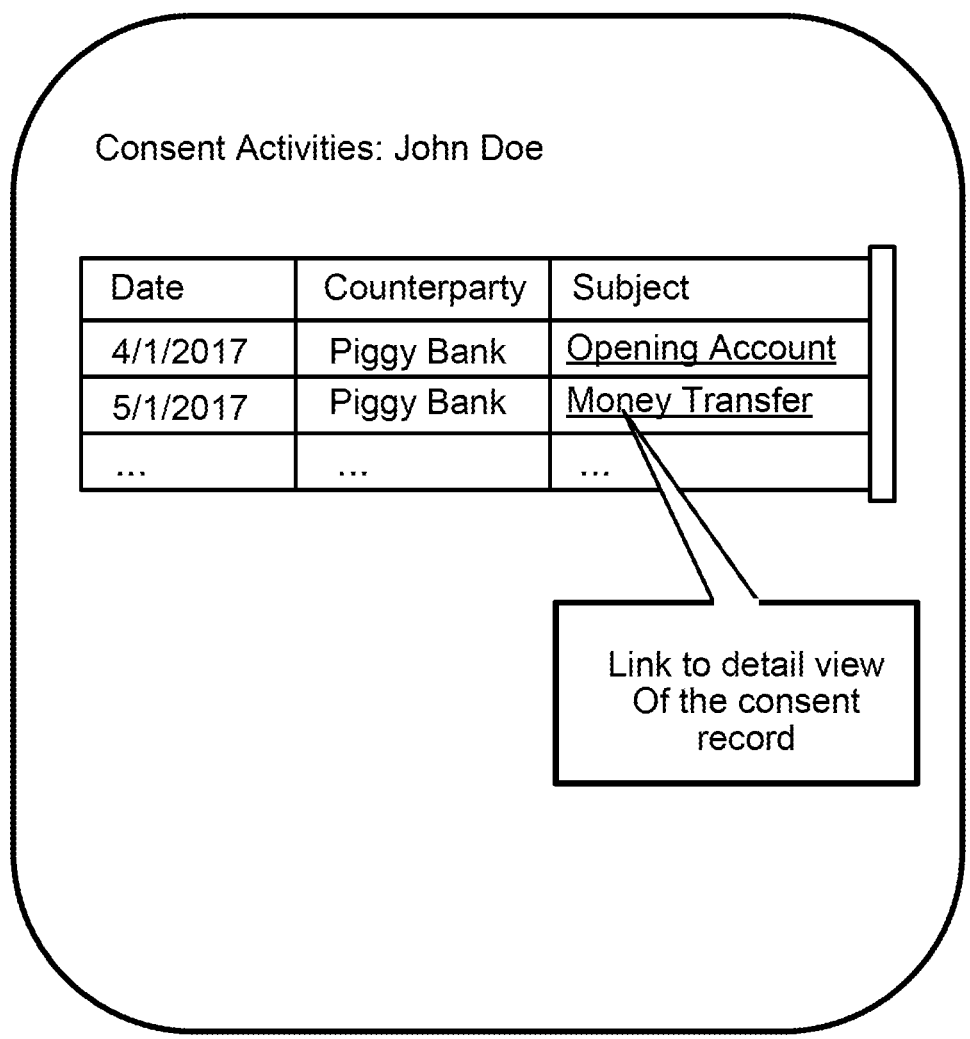
FIG. 19 illustrates an example of a consent activity log, in accordance with an example implementation.

FIG. 19 illustrates an example of a consent activity log, in accordance with an example implementation. As illustrated in FIG. 19, the consent activity log tracks each activity associated with a consumer. The consumer notation U/I 210 and the service representative U/I 220 may have money-transfer history view shown in FIG. 18 and consent activity log shown in FIG. 19, but the method to show the money transfer record can be implemented in any other ways to track the money transfer activities among multiple accounts such as graph-visualization techniques to express relations of the tracked accounts, and so on in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for maintaining bank account verification through an external system coupled to a bank system via a network, the method comprising:
    a) in response to a generation of a bank account at the bank system, generating a blockchain between the external system and the bank system associated with consumer consent information utilized for generating the bank account, the generating the blockchain comprising generating a blockchain node at the bank system configured to manage information of the consumer and to reference the consumer consent information stored in an object storage node at the bank system that is separate from the blockchain, and paired with another object storage node configured to store the consumer consent information at the external system, and wherein the consumer consent information are shared to at least one of the object store e nodes as encrypted data. which can be decrypted with a key only shared to the at least one of the object storage nodes;
    b) associating the generated blockchain node at the bank system and with a corresponding blockchain node at the external system;
    c) opening the bank account at the bank system; and
    d) providing verification to a consumer through the external system.

2. The method of claim 1, further comprising:
    e) processing subsequent transactions associated with the bank account through the blockchain between the bank system and the external system.

3. The method of claim 2, wherein the subsequent transactions comprise one or more money transfers associated with the bank account, wherein the processing subsequent transactions through the blockchain between the bank system and the external system comprises storing the one or more money transfers in the blockchain, each of the one or more money transfers associated with agreement information for the each of the one or more money transfers.

4. The method of claim 1, wherein the consumer consent information comprises digital evidence indicative of consent from the consumer, and metadata indicative of a type of the digital evidence indicative of consent.

5. The method of claim 1, further comprising:
    comparing transactions between the external system and a bank core system of the bank system, the bank core system configured to store transactions of the bank system; and
    flagging inconsistent transactions between the bank core system and the external system.

6. The method of claim 1, wherein the consumer consent information further comprises consent disclosure information indicative of one or more other bank systems that are allowed access to information associated with the bank account;
    wherein the external system manages access to the bank account from the one or more other bank systems based on the consumer consent information.

7. A non-transitory computer readable medium, storing instructions for maintaining bank account verification through an external system coupled to a bank system via a network, the instructions comprising:
    a) in response to a generation of a bank account at the bank system, generating a blockchain between the external system and the bank system associated with consumer consent information utilized for generating the bank account, the generating the blockchain comprising generating a blockchain node at the bank system configured to manage information of the consumer and to reference the consumer consent information stored in an object storage node at the bank system that is separate from the blockchain, and paired with another object storage node configured to store the consumer consent information at the external system, and wherein the consumer consent information are shared to at least one of the object storage the object storage nodes:
b) associating the generated blockchain node at the bank system and with a corresponding blockchain node at the external system;
c) opening the bank account at the bank system; and
d) providing verification to a consumer through the external system.

8. The non-transitory computer readable medium of claim 7, the instructions further comprising:
e) processing subsequent transactions associated with the bank account through the blockchain between the bank system and the external system.

9. The non-transitory computer readable medium of claim 8, wherein the subsequent transactions comprise one or more money transfers associated with the bank account, wherein the processing subsequent transactions through the blockchain between the bank system and the external system comprises storing the one or more money transfers in the blockchain, each of the one or more money transfers associated with agreement information for the each of the one or more money transfers.

10. The non-transitory computer readable medium of claim 7, wherein the consumer consent information comprises digital evidence indicative of consent from the consumer, and metadata indicative of a type of the digital evidence indicative of consent.

11. The non-transitory computer readable medium of claim 7, the instructions further comprising:
comparing transactions between the external system and a bank core system of the bank system, the bank core system configured to store transactions of the bank system; and
flagging inconsistent transactions between the bank core system and the external system.

12. The non-transitory computer readable medium of claim 7, wherein the consumer consent information further comprises consent disclosure information indicative of one or more other bank systems that are allowed access to information associated with the bank account;
wherein the external system manages access to the bank account from the one or more other bank systems based on the consumer consent information.

13. A system for maintaining bank account verification, comprising: an external system coupled to a bank system via a network, the external system comprising:
a processor, configured to:
a) in response to a generation of a bank account at the bank system, generating a blockchain between the external system and the bank system associated with consumer consent information utilized for generating the bank account, the generating the blockchain comprising generating a blockchain node at the bank system configured to manage information of the consumer and to reference the consumer consent information stored in an object storage node at the bank system that is separate from the blockchain, and paired with another object storage node configured to store the consumer consent information at the external system, and wherein the consumer consent information are shared to at least one of the object storage nodes as encrypted data, which can be decrypted with a key only shared to the at least one of the object storage nodes;
b) associating the generated blockchain node at the bank system and with a corresponding blockchain node at the external system;
c) opening the bank account at the bank system; and
d) providing verification to a consumer through the external system.

14. The system of claim 13, wherein the processor is configured to e) process subsequent transactions associated with the bank account through the blockchain between the bank system and the external system.

15. The system of claim 14, wherein the subsequent transactions comprise one or more money transfers associated with the bank account, wherein the processor is configured to process subsequent transactions through the blockchain between the bank system and the external system through storage of the one or more money transfers in the blockchain, each of the one or more money transfers associated with agreement information for the each of the one or more money transfers.

16. The system of claim 13, wherein the consumer consent information comprises digital evidence indicative of consent from the consumer, and metadata indicative of a type of the digital evidence indicative of consent.

17. The system of claim 13, wherein the processor is further configured to:
comparing transactions between the external system and a bank core system of the bank system, the bank core system configured to store transactions of the bank system; and
flagging inconsistent transactions between the bank core system and the external system.

18. The system of claim 13, wherein the consumer consent information further comprises consent disclosure information indicative of one or more other bank systems that are allowed access to information associated with the bank account;
wherein the external system manages access to the bank account from the one or more other bank systems based on the consumer consent information.

* * * * *